US011811585B2

(12) United States Patent
Han et al.

(10) Patent No.: US 11,811,585 B2
(45) Date of Patent: Nov. 7, 2023

(54) MEASURING INCIDENT MANAGEMENT PROCESS EFFICIENCY METRICS UTILIZING REAL-TIME CONVERSATION ANALYSIS

(71) Applicant: International Business Machines Corporation, Armonk, NY (US)

(72) Inventors: Shirley M. Han, New York, NY (US); Rama Kalyani T. Akkiraju, Cupertino, CA (US); Salil Ahuja, Washington, DC (US); Anbang Xu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/209,669

(22) Filed: Mar. 23, 2021

(65) Prior Publication Data

US 2022/0311655 A1  Sep. 29, 2022

(51) Int. Cl.
*H04L 41/0631* (2022.01)
*H04L 51/046* (2022.01)
(Continued)

(52) U.S. Cl.
CPC .......... *H04L 41/0631* (2013.01); *G06F 40/35* (2020.01); *H04L 41/069* (2013.01); *H04L 41/0686* (2013.01); *H04L 51/046* (2013.01)

(58) Field of Classification Search
CPC ............. H04L 41/0631; H04L 41/0627; H04L 41/0686; H04L 41/0695; H04L 41/069;
(Continued)

(56) References Cited

U.S. PATENT DOCUMENTS 7,467,090 B1 * 12/2008 Stewart ............... G06F 16/3344
704/270.1
7,945,860 B2 * 5/2011 Vambenepe ........... G06Q 30/06
715/744
(Continued)

FOREIGN PATENT DOCUMENTS

CN        100579055 C    1/2008
WO     2002093414 A1    11/2002
(Continued)

OTHER PUBLICATIONS

"Automatic Categorization of IT Infrastructure Service Management Data Using Natural Language Processing and Machine Learning", An IP.com Prior Art Database Technical Disclosure, Authors et. al.: Disclosed Anonymously, IP.com No. IPCOM000245200D, IP.com Electronic Publication Date: Feb. 18, 2016, 7 pages.
(Continued)

*Primary Examiner* — Hitesh Patel
*Assistant Examiner* — Vinh Nguyen
(74) *Attorney, Agent, or Firm* — Joseph P. Curcuru

(57) ABSTRACT

A tool for automatically generating incident management process efficiency metrics utilizing real-time communication analysis. The tool retrieves real-time conversation data from one or more communication sources, wherein the real-time conversation data includes one or more messages having data related to an information technology (IT) incident. The tool performs conversation analysis on the one or more messages. The tool determines one or more timestamps of interest for the IT incident from the one or more messages. The tool generates one or more incident management process efficiency metrics for the IT incident utilizing the one or more timestamps of interest. The tool predicts based, at least in part, on historical conversation data, an outcome for the IT incident. The tool sends the one or more incident
(Continued)

management process efficiency metrics and the outcome for the IT incident to a user in a notification.

17 Claims, 3 Drawing Sheets

(51) Int. Cl.
*H04L 41/0686* (2022.01)
*H04L 41/069* (2022.01)
*G06F 40/35* (2020.01)

(58) Field of Classification Search
CPC ....... H04L 51/046; H04L 51/16; H04L 51/32; H04L 51/04; G06F 40/35; G06F 40/40; G06F 40/56; G06F 16/243; G06F 16/3329; G06F 16/3334; G06F 16/313; G06N 20/00

See application file for complete search history.

(56) References Cited

U.S. PATENT DOCUMENTS

| | | | | |
|---|---|---|---|---|
| 8,266,072 | B2* | 9/2012 | Grace | G06Q 10/063 705/7.14 |
| 8,365,019 | B2* | 1/2013 | Sailer | G06F 11/079 714/39 |
| 10,235,681 | B2 | 3/2019 | Chang | |
| 10,679,100 | B2 | 6/2020 | Kang | |
| 10,685,654 | B2 | 6/2020 | Akkiraju | |
| 10,855,485 | B1 | 12/2020 | Zhou | |
| 10,861,022 | B2 | 12/2020 | Gupta | |
| 10,866,978 | B2 | 12/2020 | Raison | |
| 11,120,226 | B1* | 9/2021 | Nudd | G06F 40/295 |
| 2002/0087383 | A1* | 7/2002 | Cogger | G06F 11/0769 707/E17.107 |
| 2010/0325107 | A1* | 12/2010 | Kenton | G06Q 30/00 707/723 |
| 2012/0072781 | A1* | 3/2012 | Kini | G06F 11/0766 714/E11.179 |
| 2014/0149411 | A1* | 5/2014 | Anand | G06F 16/35 707/737 |
| 2015/0189086 | A1* | 7/2015 | Romano | H04M 3/5175 379/265.09 |
| 2016/0203566 | A1* | 7/2016 | Kataria | G06Q 10/06398 709/206 |
| 2016/0259778 | A1* | 9/2016 | Cookson | G06F 40/284 |
| 2017/0163498 | A1* | 6/2017 | Fisher | H04L 41/5032 |
| 2017/0286396 | A1* | 10/2017 | Sandor | G06F 40/35 |
| 2017/0329695 | A1* | 11/2017 | Bhole | G06F 11/302 |
| 2018/0075335 | A1* | 3/2018 | Braz | G06F 16/24522 |
| 2018/0288211 | A1* | 10/2018 | Kim | H04W 4/12 |
| 2018/0307675 | A1* | 10/2018 | Akkiraju | G10L 15/22 |
| 2019/0005951 | A1 | 1/2019 | Kang | |
| 2019/0073615 | A1* | 3/2019 | Ronen | A61B 5/0004 |
| 2019/0140989 | A1* | 5/2019 | Wise | H04L 51/046 |
| 2019/0325897 | A1* | 10/2019 | Liu | G10L 25/63 |
| 2020/0152184 | A1* | 5/2020 | Steedman Henderson | G06N 3/084 |
| 2020/0184355 | A1* | 6/2020 | Mehta | G06N 20/00 |
| 2021/0117251 | A1* | 4/2021 | Cristofi | G06F 9/542 |
| 2021/0297929 | A1* | 9/2021 | Frusina | H04W 4/90 |
| 2021/0334154 | A1* | 10/2021 | Kalamkar | G06F 11/0793 |
| 2022/0187815 | A1* | 6/2022 | Sinha | G05B 23/0281 |
| 2022/0292008 | A1* | 9/2022 | Kavali | G06F 9/5027 |

FOREIGN PATENT DOCUMENTS

| | | | | |
|---|---|---|---|---|
| WO | WO-2020051192 A1 * | 3/2020 | | G06F 40/35 |
| WO | WO-2020092956 A1 * | 5/2020 | | H04W 4/90 |

OTHER PUBLICATIONS

"Incident Management Procedures", NUIT, Nov. 22, 2013, Version 1.4, 31 pages.
"Incident Management Process", Vanderbilt University, Oct. 2018, 21 pages.
"Optimal Solution to Identify the Recurring Incidents in Service Management", An IP.com Prior Art Database Technical Disclosure, Authors et. al.: Disclosed Anonymously, IP.com No. IPCOM000244694D, IP.com Electronic Publication Date: Jan. 6, 2016, 7 pages.
"Restore IT Services NOW", How Moogsoft Optimizes Your ServiceNow ITSM Deployment with Situational Awareness, White Paper, Moogsoft, 2011, 11 pages, <http://moogsoft.com>.
"Strategy for Implementing an End-to-End Incident Management Process", An IP.com Prior Art Database Technical Disclosure, Authors et. al.: Disclosed Anonymously, IP.com No. IPCOM000166926D, IP.com Electronic Publication Date: Jan. 28, 2008, 17 pages.
Adams et al., "Topic Detection and Extraction in Chat", The IEEE International Conference on Semantic Computing, DOI 10.1109/ICSC.2008.61, Aug. 4-7, 2008, Santa Clara, CA, USA, 8 pages.
Oraby et al., "How May I Help You?": Modeling Twitter Customer Service Conversations Using Fine-Grained Dialogue Acts, arXiv:1709.05413v1 [cs.CL] Sep. 15, 2017, DOI: http://dx.doi.org/10.1145/3025171.3025191, IUI 2017, Mar. 13-16, 2017, Limassol, Cyprus, 13 pages.
Adams et al., "Topic Detection and Extraction in Chat", 2008 IEEE International Conference on Semantic Computing, pp. 581-588, DOI 10.1109/ICSC.2008.61.

* cited by examiner

MEASURING INCIDENT MANAGEMENT PROCESS EFFICIENCY METRICS UTILIZING REAL-TIME CONVERSATION ANALYSIS

BACKGROUND OF THE INVENTION

The present invention relates generally to information technology operations, and more particularly to incident management processes.

Information Technology (IT) Operations management is critical for most companies that rely on IT systems for mission-critical business applications. Despite the best intentions of engineers, outages do occur resulting in millions of dollars of losses in labor, revenue loss, and customer satisfaction issues, each year.

IT operations management staff (referred to as Site Reliability Engineers (SREs)) detect, diagnose and resolve incidents to measure process efficiency and determine how best to improve it. Specific metrics that IT operations managers care about in an incident management domain include mean time to detect an incident (MTTD), mean time to identify/isolate the cause of an incident (MTTI), and mean time to resolve (MTTR) an incident.

As instant messaging platforms, short-message-service (SMS), and emails are becoming essential internal communication tools for many enterprises, there is an increasing amount of SREs using these tools to communicate IT incidents. The SREs typically use various communication tools in order to communicate and debug for errors and problems they see during IT operations.

SUMMARY

Aspects of an embodiment of the present invention disclose a method, computer program product, and computer system for automatically generating incident management process efficiency metrics utilizing real-time communication analysis. The method includes retrieving, by one or more computer processors, real-time conversation data from one or more communication sources, wherein the real-time conversation data includes one or more messages having data related to an information technology (IT) incident. The method further includes performing, by the one or more computer processors, conversation analysis on the one or more messages. The method further includes determining, by the one or more computer processors, one or more timestamps of interest for the IT incident from the one or more messages. The method further includes generating, by the one or more computer processors, one or more incident management process efficiency metrics for the IT incident utilizing the one or more timestamps of interest. The method further includes predicting, by the one or more computer processors, based, at least in part, on historical conversation data, an outcome for the IT incident. The method further includes sending, by the one or more computer processors, the one or more incident management process efficiency metrics and the outcome for the IT incident to a user in a notification.

DETAILED DESCRIPTION

Figure 1:
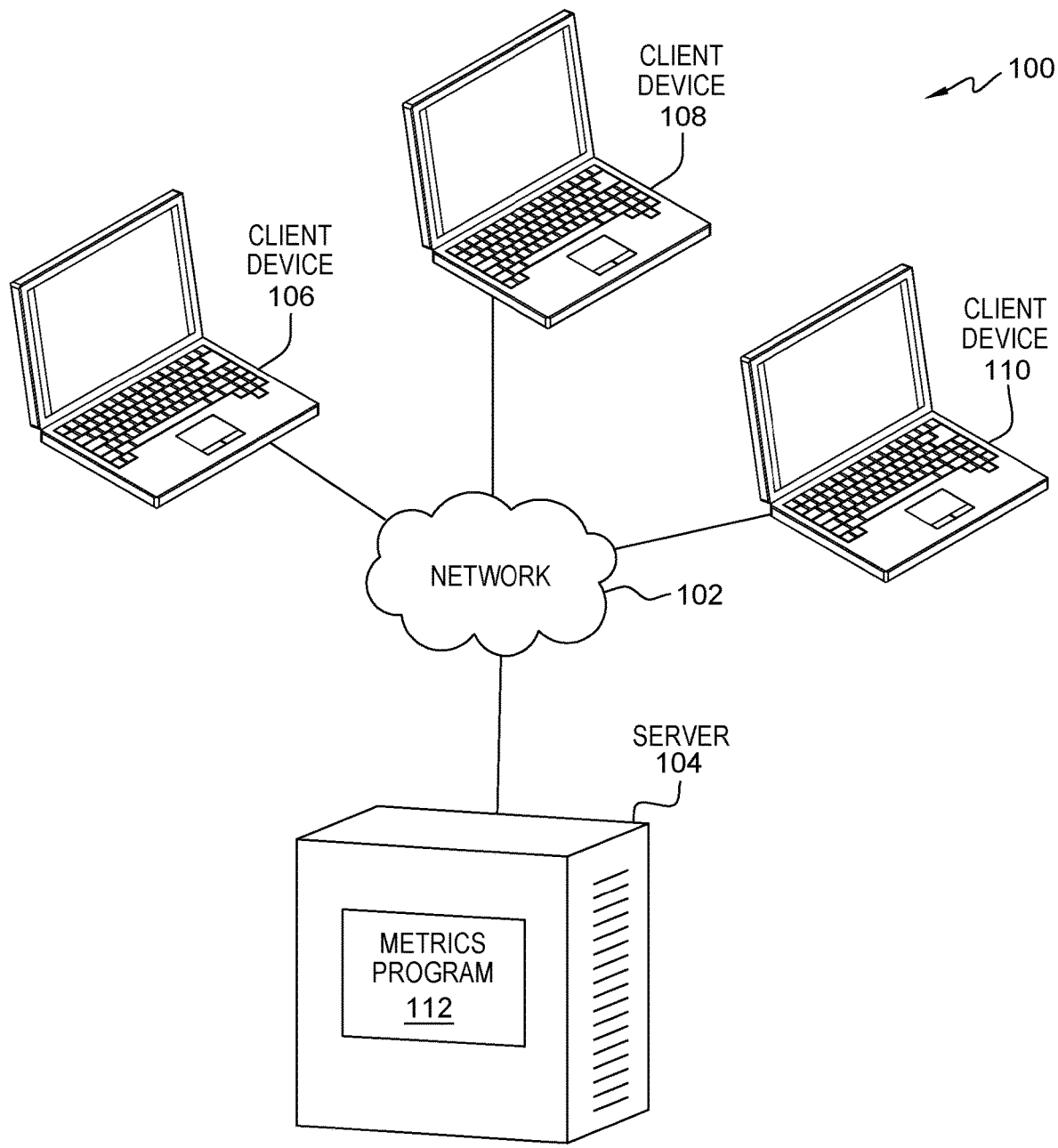
FIG. 1 illustrates a data processing environment, generally designated 100, in accordance with an embodiment of the present invention.

Embodiments of the present invention recognize that Site Reliability Engineers (SREs) may have to perform tasks blindly to the best of their abilities due to not having enough visibility into how much time is required to resolve a problem, or how much time has elapsed before an incident is detected. Embodiments of the present invention further recognize that a solution is needed that provides full automation of generating accurate metrics for IT operations managers and SREs to evaluate the process, manage the incident, and improve upon incident management process efficiency metrics.

Embodiments of the present invention recognize that while ticketing tools may capture incidents from the time observed, there may be lapses in time before an incident is officially documented or observed. Embodiments of the present invention further recognize that in order to properly record process efficiency metrics, SREs may need to manually record timestamps in a ticketing tool, or in incident tracking tool for each incident. Embodiments of the present invention recognize that manually retrieving timestamps from arrival of incidents in alerting tools, and manually recording end times to generate efficiency metrics can potentially under measure and over measure the intervening time causing the measurement process to be inefficient and inaccurate, and highlights a tedious manual process currently used to keep track of specific details relevant to an incident. Embodiments of the present invention further recognize that currently, many operation management tools either do not have functionality for measuring metrics or utilize approaches that result in inaccurate measurements, and as such, incident management process efficiency metrics may not be measured and evaluated.

Embodiments of the present invention further recognize that, given the vast amount of chat history and complexities involved with processing IT incidents, as well as understanding and synthesizing natural language programmatically, it is especially difficult to measure the quality of the incident resolution process, and provide such information to IT operations managers. Embodiments of the present invention further recognize that IT operations managers need to know how long it is taking for SREs to detect, diagnose, and resolve incidents in order to measure process efficiency. Embodiments of the present invention further recognize a need to automatically measure incident management process efficiency metrics in order to determine process quality and identify opportunities for improvements.

Embodiments of the present invention provide to IT operations managers and SREs who are responsible for ensuring the quality, performance, and availability of IT systems the capability to automatically analyze incident management process efficiency metrics. Embodiments of the present invention further provide the capability to automate the measurement of these incident management process efficiency metrics from chat transcripts and other sources of collaboration tools. Embodiments of the present invention further provide the capability to analyze real-time conversation data to understand text and generate useful metrics automatically in order to measure the incident management process efficiency. Embodiments of the present invention further provide the capability to utilize conversation analysis that can extract necessary information from communication tools to generate metrics accurately from multiple sources to quickly aid SREs in understanding the result of each incident. Embodiments of the present invention further provide the capability to analyze communications from different sources to generate incident management process efficiency metrics, and using the incident management process efficiency metrics, predict outcomes and resolutions to automatically aid SREs in understanding incident issues and facilitate faster reporting without reading through multiple messages from various sources. Embodiments of the present invention further provide the capability to utilize generated incident management process efficiency metrics to evaluate and predict what problems require more time to resolve and determine how best to improve upon response times for similar issues presented in future incidents.

Embodiments of the present invention provide an inventive approach that has advantages over other known solutions by utilizing the analysis on aggregated information from various communication sources, such as instant messaging, emails, and SMS, to automatically generate incident management process efficiency metrics with time awareness. Another advantage of the inventive approach includes leveraging natural language processing techniques, such as dialog act, sentiment analysis and machine learning, to automatically generate accurate and relevant incident management process efficiency metrics. Another advantage of the inventive approach includes providing improved prioritization of different work to be performed by SREs, since the timestamps extracted from conversations provide accurate information of urgency, such as Mean Time to Detection or Mean Time to Resolve. Moreover, the inventive approach provides an advantage over other known solutions by utilizing specific IT domain knowledge to identify relevant text for incident management process efficiency metrics, which improves chat analysis specificity for the IT operation domain and provides more accurate information. Further, the inventive approach utilizes machine learning methods to proactively predict the conversation outcome (e.g., whether an incident will be resolved, time it will take to resolve the incident, etc.) based on identified and extracted information from communication sources.

Implementation of such embodiments may take a variety of forms, and exemplary implementation details are discussed subsequently with reference to the Figures.

Referring now to various embodiments of the invention in more detail, FIG. 1 is a functional block diagram that illustrates a data processing environment, generally designated 100, suitable for providing a secure communication channel during three-way communications, in accordance with at least one embodiment of the invention. The present invention will now be described in detail with reference to the Figures. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes network 102, server 104, one or more client devices, such as client device 106, client device 108, and client device 110, and metrics program 112.

In one embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server 104, client device 106, client device 108, and client device 110 are interconnected by network 102. Network 102 can be any combination of connections and protocols capable of supporting communications between server 104, client device 106, client device 108, client device 110, and metrics program 112. Network 102 can be, for example, a telecommunications network, a local area network (LAN), a virtual local area network (VLAN), a wide area network (WAN), such as the Internet, or a combination of the three, and can include wired, wireless, or fiber optic connections. Network 102 may include one or more wired and/or wireless networks that are capable of receiving and transmitting data, voice, and/or video signals, including multimedia signals that include voice, data, and video information. In general, network 102 may be any combination of connections and protocols that will support communications between server 104, client device 106, client device 108, client device 110, and metrics program 112, as well as other computing devices (not shown) within data processing environment 100. FIG. 1 is intended as an example and not as an architectural limitation for the different embodiments.

In one embodiment, server 104 may be, for example, a server computer system such as a management server, a web server, or any other electronic device or computing system capable of sending and receiving data. In another embodiment, server 104 may be a data center, consisting of a collection of networks and servers providing an IT service, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This configuration may be implemented for data centers in addition to cloud computing applications. In one embodiment, server 104 includes metrics program 112 for automatically generating incident management process efficiency metrics utilizing real-time communication analysis.

In one embodiment, metrics program 112 operates on a central server, such as server 104, and can be utilized by one or more client devices, such as client device 106, client device 108, and client device 110, via an application download from the central server or a third-party application store and executed on the one or more client devices. In another embodiment, metrics program 112 may be software, downloaded from a central server, such as server 104, and installed on one or more client devices, such as client device 106, client device 108, and client device 110. In yet another embodiment, metrics program 112 may be utilized as a software service provided by a third-party cloud service provider (not shown). In yet another embodiment, metrics program 112 may include one or more components (not shown), such as add-ons, plug-ins, and agent programs, etc., installed on one or more client devices, such as client device 106, client device 108, and client device 110, for automatically generating incident management process efficiency metrics utilizing real-time communication analysis. In one embodiment, metrics program 112 can be an add-on feature to a third-party IT incident management service that provides a user, such as a SRE or an IT incident manager, the ability to automatically generating incident management process efficiency metrics utilizing real-time communication analysis. In one embodiment, metrics program 112 can be fully integrated with a third-party interpreting service. In some embodiments, metrics program 112 may be partially integrated or separate from an IT incident management service. In one embodiment, metrics program 112 may be an application, downloaded from an application store or third-party provider, capable of being used in conjunction with IT incident management tools on one or more client devices, such as client device 106, client device 108, and client device 110, to automatically generating incident management process efficiency metrics utilizing real-time communication analysis.

In one embodiment, metrics program 112 can be utilized by a client device, such as client device 106, client device 108, and client device 110, to automatically generate incident management process efficiency metrics utilizing real-time communication analysis. In one embodiment, metrics program 112 provides the capability to receive real-time conversation data from various communication sources, such as instant messaging platforms, SMS, electronic mail, and collaboration applications. In one embodiment, metrics program 112 provides the capability to utilize natural language processing (NLP) techniques and machine learning models to analyze conversation data (chat, text, phrases, messages, etc.) in real-time, and extract timestamps, contextual data, and other information relevant to IT incident management from the conversation data. In one embodiment, metrics program 112 provides the capability to utilize dialog act classification techniques to classify dialogs extracted from conversation data, and determine whether the dialogs indicate problem statements, questions, incidents, resolutions, etc. In one embodiment, metrics program 112 provides the capability calculate various service-level incident management process efficiency metrics utilizing extracted dialogs from real-time conversation data and return the calculated incident management process efficiency metrics to users (e.g., SREs, IT incident managers, other users, etc.) as a message (e.g., instant message, SMS, electronic mail, message board post, or any other type electronic communication, etc.). In one embodiment, metrics program 112 provides the capability to gather feedback from users related to incident management process efficiency metrics and utilize that feedback to refine and enhance a machine learning model for predicting conversation outcome and resolution of incidents.

In one embodiment, metrics program 112 may be configured to access various data sources, such as a database or repository (not shown), that may include personal data, content, contextual data, or information a user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Metrics program 112 enables the authorized and secure processing of personal data. In one embodiment, metrics program 112 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In another embodiment, metrics program 112 provides information regarding personal data and the nature (e.g., type, scope, purpose, duration, etc.) of the processing. In one embodiment, metrics program 112 provides a user with copies of stored personal data. In one embodiment, metrics program 112 allows the correction or completion of incorrect or incomplete personal data. In one embodiment, metrics program 112 allows the immediate deletion of personal data.

In one embodiment, client device 106, client device 108, and client device 110 are clients to server 104 and may be, for example, a desktop computer, a laptop computer, a tablet computer, a personal digital assistant (PDA), a smart phone, a thin client, or any other electronic device or computing system capable of communicating with server 104 through network 102. For example, client device 106 may be a mobile device, such as a smart phone, capable of connecting to a network, such as network 102, to access the Internet, utilize one or more IT incident management tools, and utilize one or more software applications. In another example, client device 108 and client device 110 may be a computing device utilized by an IT incident management service, respectively. In one embodiment, client device 106, client device 108, and client device 110 may be any suitable type of client device capable of executing one or more applications utilizing a mobile operating system or a computer operating system. In one embodiment, client device 106, client device 108, and client device 110 may include a user interface (not shown) for providing a user (e.g., a SRE, client, or IT incident manager, etc.) with the capability to interact with metrics program 112, one or more SREs utilizing a computing device, such as client device 108, and one or more communications originating from a computing device, such as client device 110. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In one embodiment, client device 106, client device 108, and client device 110 may be any wearable electronic devices, including wearable electronic devices affixed to eyeglasses and sunglasses, helmets, wristwatches, clothing, wigs, tattoos, embedded devices, and the like, capable of sending, receiving, and processing data. In one embodiment, client device 106, client device 108, and client device 110 may be any wearable computer capable of operating a computer program, such as metrics program 112, to automatically generate incident management process efficiency metrics utilizing real-time communication analysis. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 106, client device 108, and client device 110 each represent one or more programmable electronic devices or combination of programmable electronic devices capable of executing machine readable program instructions and communicating with other computing devices (not shown) within data processing environment 100 via a network, such as network 102.

Figure 2:
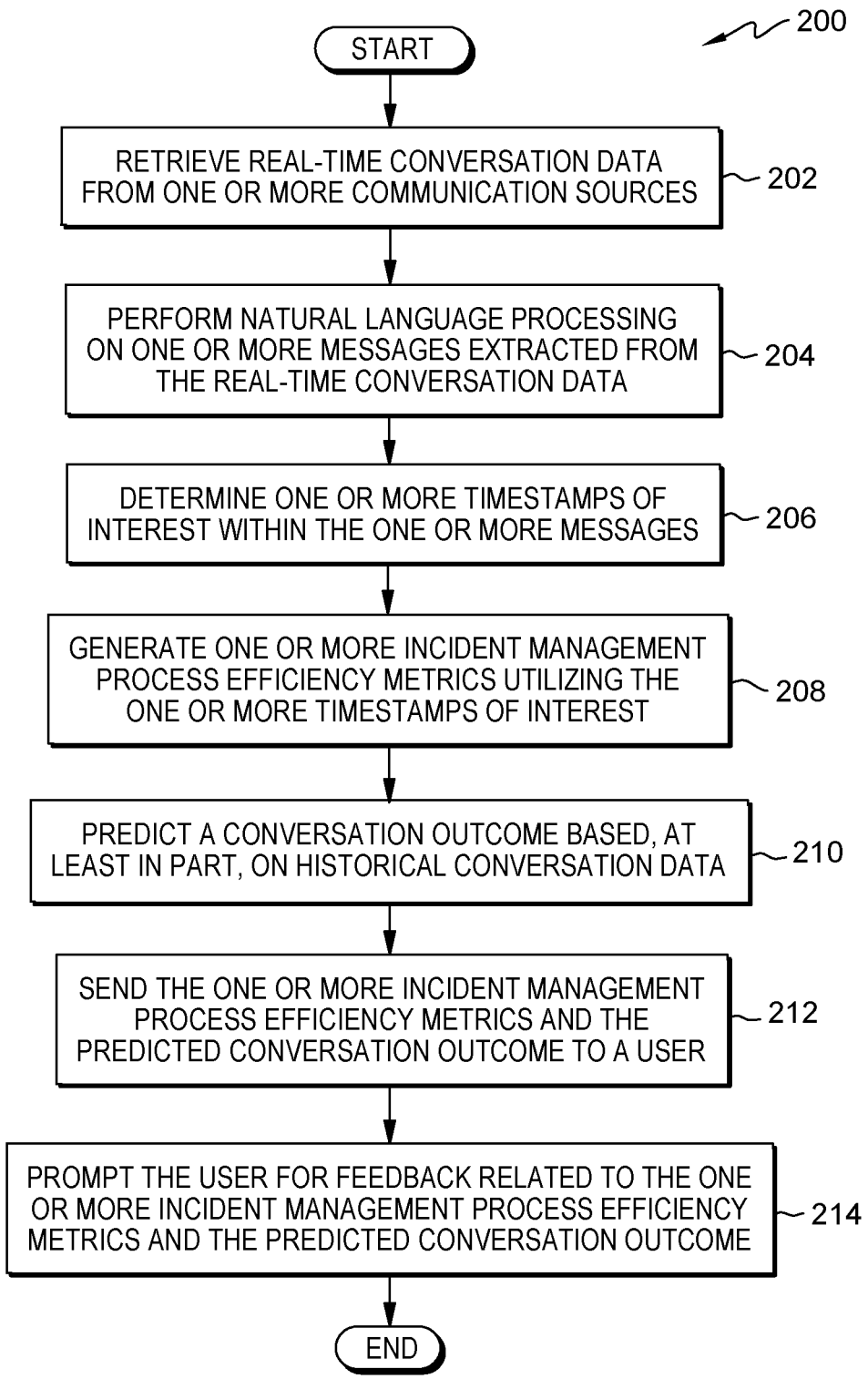
FIG. 2 is a flowchart depicting operational steps of a metrics program, such as the metrics program of FIG. 1, generally designated 200, for automatically generating incident management process efficiency metrics utilizing real-time communication analysis, in accordance with an embodiment of the present invention.

FIG. 2 is a flowchart depicting operational steps of a metrics program, such as metrics program 112, generally designated 200, for automatically generating incident management process efficiency metrics utilizing real-time communication analysis, in accordance with an embodiment of the present invention.

Metrics program 112 retrieves real-time conversation data from one or more communication sources (202). In one embodiment, metrics program 112 retrieves real-time conversation data from one or more communication sources by monitoring real-time conversation data transmitted on one or more communication sources, such as an instant messaging platform, short-message-service (SMS), electronic mail, forums, and video collaboration applications, data feeds, etc., and extracting the real-time conversation data transmitted on the one or more communication sources. In one embodiment, metrics program 112 retrieves the real-time conversation data from the one or more communication sources, which can be any type of electronic communication tool known in the art. In one embodiment, the real-time conversation data includes one or more messages between two or more users (e.g., SREs, end users, IT managers, etc.), where the one or more messages include information regarding an information technology (IT) incident (e.g., ongoing or current IT incident), such as a failed application server (i.e., a server outage) resulting in poor connectivity. In one embodiment, the information regarding the IT incident includes a plurality of timestamps indicating when an electronic communication or conversation was initiated, one or more messages indicating a specific IT incident, an outage, an application failure, reliability issues, etc., and a real-time dialog (i.e., a plurality of text, video, or image exchanges) between two or more users.

For example, metrics program 112 retrieves real-time conversation data from an initial conversation shared between a first SRE on a computing device, such as client device 106, and a second SRE on a computing device, such as client device 108, utilizing an instant messaging platform over a network, such as network 102. In this example, in response to failure messages (e.g., alerts, notifications, etc.) from a log file of an application server being posted in a chat at 10:00 AM, metrics program 112 retrieves real-time conversation data from a plurality of instant messages sent from the first SRE to the second SRE. In this example, at 1:30 PM, the first SRE sends an instant message to the second SRE, stating "I am noticing an incident right now in the application. I will investigate the cause of the issue". At 1:50 PM, the second SRE replies to the first SRE, stating "It seems like the incident is due to an unexpected system shutdown earlier today at 10:00 AM. It is causing slow connectivity on the end user side. Perhaps restarting the system will resolve?". At 2:00 PM, the first SRE replies to the second SRE, stating "Yes, that is correct. I have now fixed the issue by restarting the system. System is functioning normally." In this example, metrics program 112 retrieves real-time conversation data from the plurality of instant messages sent between the first SRE and the second SRE by extracting timestamps and text dialog from each of the plurality of instant messages.

Metrics program 112 performs natural language processing on one or more messages extracted from the real-time conversation data (204). In one embodiment, metrics program 112 performs natural language processing (i.e., conversation analysis) on one or more messages extracted from the real-time conversation data utilizing a machine learning model that analyzes chat (e.g., text, dialog, sentences, phrases, etc.) in real-time and extracts timestamps associated with the chat that are relevant to IT operations and IT incident management. In one embodiment, metrics program 112 performs conversation analysis by performing dialog act classification techniques and sentiment analysis to classify dialog from the one or more messages into one or more relevant dialog acts (e.g., relevant dialog act categories), where the one or more relevant dialog acts are IT domain specific to assist a user in understanding a conversation in an IT operations environment. In one embodiment, metrics program 112 utilizes the machine learning model to model conversations and classify dialog from the conversations into one or more relevant dialog acts, where the one or more relevant dialog acts include, but are not limited to, alerts, acknowledgements, actions required, informative statements, time, suggestions, requests for action, user information, and problem resolutions, etc. In one embodiment, metrics program 112 utilizes the dialog classified into the one or more relevant dialog acts to determine whether the dialog indicates a problem statement, a question, an IT incident, and an IT resolution, etc. In one embodiment, metrics program 112 performs natural language processing on aggregated messages extracted from the real-time conversation data utilizing dialog act classification techniques and sentiment analysis known in the art. In one embodiment, metrics program 112 defines IT domain specific taxonomy related to one or more dialog acts to be applied to one or more messages to determine relevant text within the one or more messages useful for generating relevant incident management process efficiency metrics. In one embodiment, metrics program 112 utilizes machine learning conversation modeling to identify relevant dialog acts within the one or more messages that describe events related to an IT incident.

In one embodiment, metrics program 112 annotates the one or more messages with relevant dialog acts to derive insights into the one or more messages, relevant text within the one or more messages, and highlight important IT events related to an IT incident. In one embodiment, metrics program 112 provides each of the one or more messages, annotations associated with the one or more messages, and the relevant dialog act classifications for relevant IT information identified in the one or more messages in a user accessible table.

For example, during the initial conversation in the above example, metrics program 112 performs natural language processing on one or more messages extracted from the real-time conversation data to identify and determine IT events from the exchanges between the first SRE and the second SRE. In this example, metrics program 112 utilizes dialog act classification techniques and sentiment analysis to identify the failure message from the log file of the application server being posted in a chat at 10:00 AM and classify this failure message as an alert to an IT incident. In this example, at 1:30 PM, the first SRE sends the instant message to the second SRE, stating "I am noticing an incident right now in the application. I will investigate the cause of the issue", and utilizing natural language processing techniques, dialog act classification technologies and sentiment analysis, metrics program 112 determines relevant IT data related to the identified IT incident within the instant message and classifies this relevant IT data as an acknowledgement of the IT incident by the first SRE. In this example, at 1:50 PM, the second SRE replies to the first SRE, stating "It seems like the incident is due to an unexpected system shutdown earlier today at 10:00 AM. It is causing slow connectivity on the end user side. Perhaps restarting the system will resolve?", and utilizing natural language processing techniques, dialog act classification technologies and sentiment analysis, metrics program 112 determines relevant IT data related to the identified IT incident within the first reply message and classifies this relevant IT data as an informative statement of the IT incident by the second SRE that includes a time and a suggestion. In this example, at 2:00 PM, the first SRE replies to the second SRE, stating "Yes, that is correct. I have now fixed the issue by restarting the system. System is functioning normally", and utilizing natural language processing techniques, dialog act classification technologies and sentiment analysis, metrics program 112 determines relevant IT data related to the identified IT incident within the second reply message and classifies this relevant IT data as an informative statement of the IT incident by the first SRE that includes a confirmation that the incident has been resolved.

Metrics program 112 determines one or more timestamps of interest within the one or more messages (206). In one embodiment, metrics program 112 determines one or more timestamps of interest within the one or more messages by analyzing the determined relevant dialog acts for the one or more messages. In one embodiment, metrics program 112 determines one or more timestamps of interest within the one or more messages by utilizing the conversation modeling of the dialog acts to identify timestamps within the one or more messages that are associated with data related to an IT incident that is classified into the one or more dialog acts. In one embodiment, metrics program 112 examines the relevant dialog acts, and utilizing natural language processing and conversation modeling techniques, extracts one or more timestamps associated with the identified relevant dialog acts. In one embodiment, metrics program 112 annotates the extracted one or more timestamps with a brief summation or description of the identified relevant dialog acts and stores the extracted one or more timestamps with the associated annotation. In one embodiment, metrics program 112 may provide the annotated one or more timestamps in a user accessible table along with the one or more messages and the identified relevant dialog acts.

For example, during the conversation in the above examples, metrics program 112 determines one or more timestamps of interest within the one or more messages by analyzing the determined relevant dialog acts for the one or more messages from the exchanges between the first SRE and the second SRE. In this example, metrics program 112 utilizes dialog act classification techniques and sentiment analysis to identify the failure message from the log file of the application server being posted in a chat at 10:00 AM and determines a timestamp of interest for the start of the incident, the alert, and confirmation by the first SRE as "10:00 AM—Start of incident, Alert sent". In this example, at 1:30 PM, the first SRE sends the instant message to the second SRE, stating "I am noticing an incident right now in the application. I will investigate the cause of the issue", and utilizing natural language processing techniques, dialog act classification technologies and sentiment analysis, metrics program 112 determines a timestamp of interest for the acknowledgement of the IT incident by the first SRE as "1:30 PM—Incident confirmed by #1 SRE, First Response of incident in Chat". In this example, at 1:50 PM, the second SRE replies to the first SRE, stating "It seems like the incident is due to an unexpected system shutdown earlier today at 10:00 AM. It is causing slow connectivity on the end user side. Perhaps restarting the system will resolve?", and utilizing natural language processing techniques, dialog act classification technologies and sentiment analysis, metrics program 112 determines a timestamp of interest for the informative statement of the IT incident by the second SRE as "10:00 AM—Confirmation of earlier alert as start of incident" (Note that "1:50 PM" is not stored as a timestamp of interest because the dialog acts for this message are a suggestion and an informative statement). In this example, at 2:00 PM, the first SRE replies to the second SRE, stating "Yes, that is correct. I have now fixed the issue by restarting the system. System is functioning normally", and utilizing natural language processing techniques, dialog act classification technologies and sentiment analysis, metrics program 112 determines a timestamp of interest for the confirmation that the incident has been resolved as "2:00 PM—Problem resolved".

Metrics program 112 generates one or more incident management process efficiency metrics utilizing the one or more timestamps of interest (208). In one embodiment, metrics program 112 generates one or more incident management process efficiency metrics utilizing the one or more timestamps of interest and the relevant dialog acts to calculate service-level metrics automatically once a sufficient volume of data is stored, where the incident management process efficiency metrics include, but are not limited to, mean time to resolve, mean time to detect, mean time to identify/isolate the cause of an incident, and mean initial response time, etc. For example, metrics program 112 may generate a mean time to resolve (MTTR) incident management process efficiency metric as "MTTR—4 hours" once a start of an incident timestamp, such as "10:00 AM—Start of incident, Alert sent", and a problem resolved timestamp, such as "2:00 PM—Problem resolved", is stored. In another example, metrics program 112 may generate a mean time to detect (MTTD) incident management process efficiency metric as "MTTD—3 hours 30 minutes" once a start of an incident timestamp, such as "10:00 AM—Start of incident, Alert sent", and a first acknowledgement of the incident timestamp, such as "1:30 PM—Incident confirmed by #1 SRE, First Response of incident in Chat". In one embodiment, metrics program 112 efficiently calculates one or more incident management process efficiency metrics based on a stored catalog of a plurality of timestamps of interest.

Metrics program 112 predicts a conversation outcome based, at least in part, on historical conversation data (210). In one embodiment, metrics program 112 predicts a conversation outcome (i.e., an outcome or resolution for the IT incident) based, at least in part, on a machine learning model that utilizes historical conversation data (e.g., prior chat history regarding similar prior IT incidences) and the stored one or more timestamps of interest for the historical conversation data. In one embodiment, metrics program 112 references a plurality of stored timestamps and associated annotations from historical conversation data related to one or more IT incidents to generate a predicted outcome for the IT incident. For example, where an IT incident, such as an unexpected system shutdown, occurs at 10:00 AM, and the incident is first detected by an SRE at 10:30 AM, metrics program 112 may predict an outcome for an IT incident of "11:00 AM—Problem should be resolved", based, at least in part, on similarity to one or more stored timestamps, such as those from the above example, that indicate a similar unexpected system shutdown was resolved 30 minutes after being detected by the SRE. In some embodiments, metrics program 112 may generates one or more recommendations to prioritize IT incidents and critical workload based, at least in part, on a complexity of the incident and a time required to resolve the incident, etc., to improve incident management processes and preserve valuable IT management resources.

Metrics program 112 sends the one or more incident management process efficiency metrics and the predicted conversation outcome to a user (212). In one embodiment, metrics program 112 sends the one or more incident management process efficiency metrics and the predicted conversation outcome to a user (e.g., SRE, IT operations manager, etc.) as a message or chat notification. In one embodiment, metrics program 112 may send the one or more incident management process efficiency metrics and the predicted conversation outcome to the user via a graphical user interface, such as a user accessible table within the graphical user interface, to provide real-time chat analysis to measure incident management process efficiency metrics automatically without requiring the user to manually read through chat history and recorded timestamps, as well as expedite actions taken to resolve an IT incident. In another embodiment, metrics program 112 may send the one or more incident management process efficiency metrics and the predicted conversation outcome to the user in a message, such as a ping, a chat message, an email, an SMS text, notification, or alert, to provide real-time chat analysis to measure incident management process efficiency metrics automatically without requiring the user to manually read through chat history and recorded timestamps, as well as expedite actions taken to resolve an IT incident.

Metrics program 112 prompts the user for feedback related to the one or more incident management process efficiency metrics and the predicted conversation outcome (214). In one embodiment, metrics program 112 prompts the user for feedback related to the one or more incident management process efficiency metrics and the predicted conversation outcome to improve the machine learning model for further IT incidents. In one embodiment, metrics program 112 prompts the user to accept or reject the one or more incident management process efficiency metrics and the predicted conversation outcome. Where a user rejects any of the one or more incident management process efficiency metrics or the predicted conversation outcome, metrics program 112 inputs the feedback into the natural language processing and conversation modeling techniques to improve future output. Where a user accepts any of the one or more incident management process efficiency metrics or the predicted conversation outcome, metrics program 112 applies the one or more incident management process efficiency metrics and the predicted conversation outcome to future IT incidents.

Figure 3:
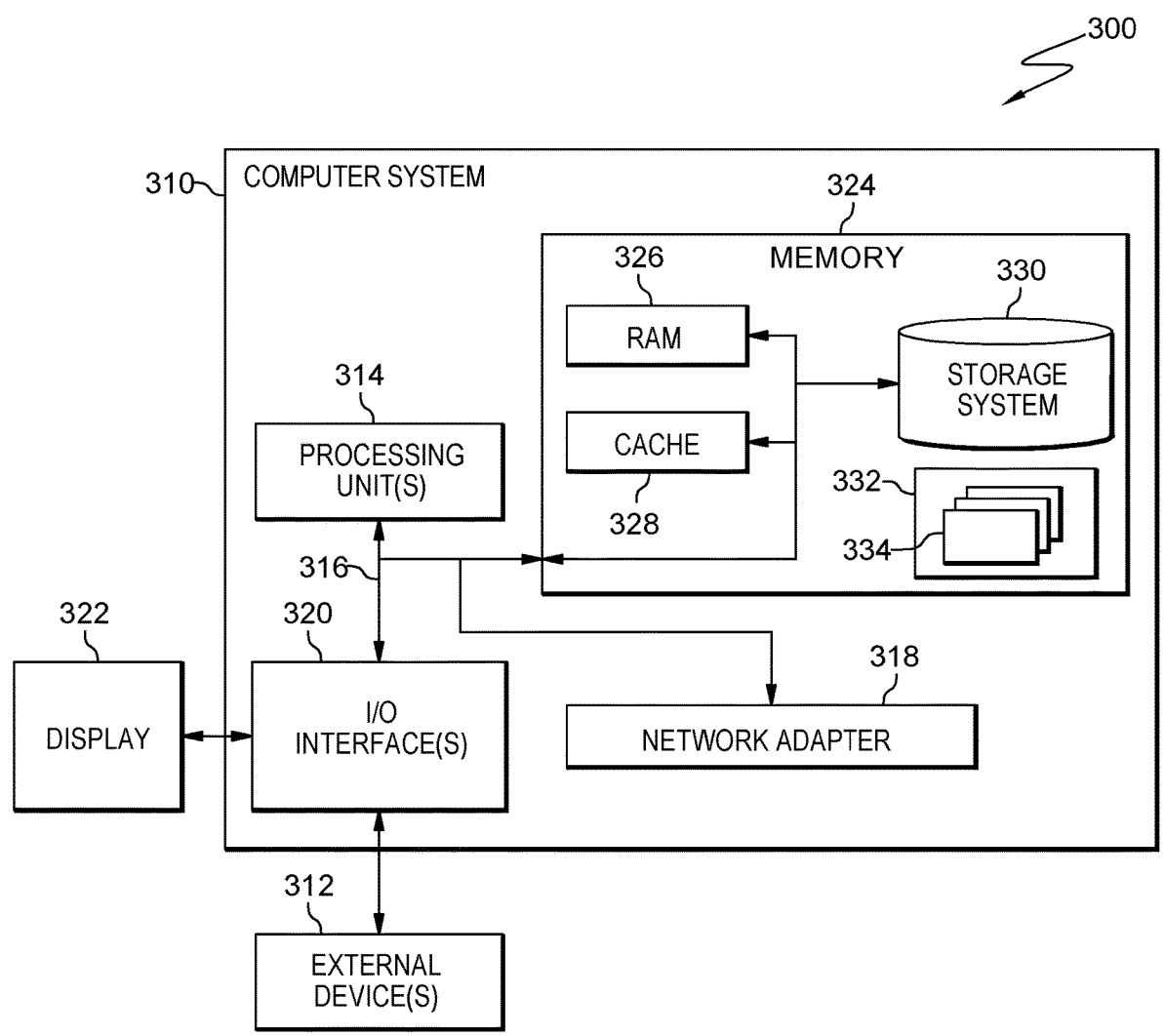
FIG. 3 is a block diagram depicting components of a data processing environment, such as the server of FIG. 1, generally designated 300, in accordance with an embodiment of the present invention.

FIG. 3 is a block diagram depicting components of a data processing environment, such as server 104 of data processing environment 100, generally designated 300, in accordance with an embodiment of the present invention. It should be appreciated that FIG. 3 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device, such as computer system 310. The components of computer system 310 may include, but are not limited to, one or more processors or processing unit(s) 314, memory 324 and bus 316 that couples various system components including memory 324 to processing unit(s) 314.

Bus 316 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 310 typically includes a variety of computer system readable media. Such media may be any available media that is accessible by computer system 310 and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example and not limitation, as well as an operating system, one or more application programs, other program modules and program data. Each of the operating systems, one or more application programs, other program modules and program data or some combination thereof, may include an implementation of a networking environment. Program modules 334 generally carry out the functions and/or methodologies of embodiments of the invention as described herein. Computer system 310 may also communicate with one or more external device(s) 312, such as a keyboard, a pointing device, a display 322, etc. or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks, such as a local area network (LAN), a general wide area network (WAN) and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives and data archival storage systems may be used in conjunction with computer system 310.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for automatically generating incident management process efficiency metrics utilizing real-time communication analysis, the method comprising:
retrieving, by one or more computer processors, real-time conversation data from one or more communication sources, wherein the real-time conversation data comprises one or more messages having data related to an information technology (IT) incident;
performing, by the one or more computer processors, conversation analysis on the one or more messages, wherein performing the conversation analysis, further comprises:
performing, by the one or more computer processors, dialog act classification techniques and sentiment analysis to classify the data related to the IT incident into the one or more relevant dialog acts;
determining, by the one or more computer processors, one or more timestamps of interest for the IT incident based, at least in part, on one or more relevant dialog acts for one or more events related to the IT incident, wherein the one or more relevant dialog acts are IT domain specific acts related to a plurality of incident management process efficiency metrics, and wherein the plurality of incident management process efficiency metrics include a mean time to resolve, a mean time to detect, a mean time to identify a cause of the IT incident, and a mean initial response time;
annotating, by the one or more computer processors, the one or more messages with the one or more relevant dialog acts and the one or more timestamps of interest for the IT incident;
generating, by the one or more computer processors, one or more incident management process efficiency metrics for the IT incident utilizing the one or more timestamps of interest and the relevant dialog acts to calculate service-level metrics automatically once a predetermined volume of data is stored;
predicting, by the one or more computer processors, based, at least in part, on historical conversation data, and a plurality of stored timestamps and associated annotations from historical conversation data related to one or more IT incidents, an outcome for the IT incident, wherein predicting the outcome further comprises:
referencing the one or more timestamps and annotations from the historical conversation data related to the IT incident; and
sending, by the one or more computer processors, the one or more incident management process efficiency metrics and the outcome for the IT incident to a user in a notification.

2. The method of claim 1, wherein the one or more relevant dialog acts are information technology (IT) domain specific categories selected from a group consisting of alerts, acknowledgements, actions, informative statements, times, suggestions, requests for actions, and problem resolutions.

3. The method of claim 1, wherein performing the conversation analysis, further comprises:
performing, by the one or more computer processors, conversation modeling to identify the data related to the IT incident within the one or more messages that describes the one or more events related to the IT incident.

4. The method of claim 1, wherein determining the one or more timestamps of interest, further comprises:
extracting, by the one or more computer processors, one or more timestamps associated with one or more relevant dialog acts from the one or more messages;
annotating, by the one or more computer processors, the one or more timestamps with a description of the one or more relevant dialog acts; and
storing, by the one or more computer processors, the one or more timestamps with the annotations as the one or more timestamps of interest.

5. The method of claim 1, wherein the one or more timestamps of interest are timestamps associated with data related to the IT incident classified into each of one or more relevant dialog acts.

6. The method of claim 1, further comprising:
defining, by the one or more computer processors, information technology (IT) domain specific taxonomy related to one or more dialog acts to be applied to the one or more messages; and
determining, by the one or more computer processors, based, at least in part, on the IT domain specific taxonomy, a plurality of relevant dialog related to the IT incident within the one or more messages.

7. A computer program product automatically generating incident management process efficiency metrics utilizing real-time communication analysis, the computer program product comprising:
one or more computer readable storage media and program instructions stored on the one or more computer readable storage media, the stored program instructions comprising:
program instructions to retrieve real-time conversation data from one or more communication sources, wherein the real-time conversation data comprises one or more messages having data related to an information technology (IT) incident;
program instructions to perform conversation analysis on the one or more messages, wherein the program instructions to perform the conversation analysis further comprise:
program instructions to perform dialog act classification techniques and sentiment analysis to classify the data related to the IT incident into the one or more relevant dialog acts;
program instructions to determine one or more timestamps of interest for the IT incident based, at least in part, on one or more relevant dialog acts for one or more events related to the IT incident, wherein the one or more relevant dialog acts are IT domain specific acts related to a plurality of incident management process efficiency metrics, and wherein the plurality of incident management process efficiency metrics include a mean time to resolve, a mean time to detect, a mean time to identify a cause of the IT incident, and a mean initial response time;
program instructions to annotate the one or more messages with the one or more relevant dialog acts and the one or more timestamps of interest for the IT incident;
program instructions to generate one or more incident management process efficiency metrics for the IT incident utilizing the one or more timestamps of interest and the relevant dialog acts to calculate service-level metrics automatically once a predetermined volume of data is stored;
program instructions to predict based, at least in part, on historical conversation, and a plurality of stored timestamps and associated annotations from historical conversation data related to one or more IT incidents data an outcome for the IT incident, wherein predicting the outcome further comprises:
program instructions to reference the one or more timestamps and annotations from the historical conversation data related to the IT incident; and
program instructions to send the one or more incident management process efficiency metrics and the outcome for the IT incident to a user in a notification.

8. The computer program product of claim 7, wherein the one or more relevant dialog acts are information technology (IT) domain specific categories selected from a group consisting of alerts, acknowledgements, actions, informative statements, times, suggestions, requests for actions, and problem resolutions.

9. The computer program product of claim 7, wherein the program instructions to perform the conversation analysis further comprise:
program instructions to perform conversation modeling to identify the data related to the IT incident within the one or more messages that describes the one or more events related to the IT incident.

10. The computer program product of claim 7, wherein the program instructions to determine the one or more timestamps of interest further comprise:
program instructions to extract one or more timestamps associated with one or more relevant dialog acts from the one or more messages;
program instructions to annotate the one or more timestamps with a description of the one or more relevant dialog acts; and
program instructions to store the one or more timestamps with the annotations as the one or more timestamps of interest.

11. The computer program product of claim 7, wherein the one or more timestamps of interest are timestamps associated with data related to the IT incident classified into each of one or more relevant dialog acts.

12. The computer program product of claim 7, the stored program instructions further comprising:
program instructions to define information technology (IT) domain specific taxonomy related to one or more dialog acts to be applied to the one or more messages; and
program instructions to determine based, at least in part, on the IT domain specific taxonomy, a plurality of relevant dialog related to the IT incident within the one or more messages.

13. A computer system for automatically generating incident management process efficiency metrics utilizing real-time communication analysis, the computer system comprising:
one or more computer processors;
one or more computer readable storage media; and
program instructions stored on at least one of the one or more computer readable storage media for execution by at least one of the one or more computer processors, the stored program instructions comprising:
program instructions to retrieve real-time conversation data from one or more communication sources, wherein the real-time conversation data comprises one or more messages having data related to an information technology (IT) incident;
program instructions to perform conversation analysis on the one or more messages, wherein the program instructions to perform the conversation analysis further comprise:
program instructions to perform dialog act classification techniques and sentiment analysis to classify the data related to the IT incident into the one or more relevant dialog acts;
program instructions to determine one or more timestamps of interest for the IT incident based, at least in part, on one or more relevant dialog acts for one or more events related to the IT incident, wherein the one or more relevant dialog acts are IT domain specific acts related to a plurality of incident management process efficiency metrics, and wherein the plurality of incident management process efficiency metrics include a mean time to resolve, a mean time to detect, a mean time to identify a cause of the IT incident, and a mean initial response time;
program instructions to annotate the one or more messages with the one or more relevant dialog acts and the one or more timestamps of interest for the IT incident;
program instructions to generate one or more incident management process efficiency metrics for the IT incident utilizing the one or more timestamps of interest and the relevant dialog acts to calculate service-level metrics automatically once a predetermined volume of data is stored;
program instructions to predict based, at least in part, on historical conversation, and a plurality of stored timestamps and associated annotations from historical conversation data related to one or more IT incidents data an outcome for the IT incident, wherein predicting the outcome further comprises:
program instructions to reference the one or more timestamps and annotations from the historical conversation data related to the IT incident; and
program instructions to send the one or more incident management process efficiency metrics and the outcome for the IT incident to a user in a notification.

14. The computer system of claim 13, wherein the one or more relevant dialog acts are information technology (IT) domain specific categories selected from a group consisting of alerts, acknowledgements, actions, informative statements, times, suggestions, requests for actions, and problem resolutions.

15. The computer system of claim 13, wherein the program instructions to perform the conversation analysis further comprise:
program instructions to perform conversation modeling to identify the data related to the IT incident within the one or more messages that describes the one or more events related to the IT incident.

16. The computer system of claim 13, wherein the program instructions to determine the one or more timestamps of interest further comprise:
program instructions to extract one or more timestamps associated with one or more relevant dialog acts from the one or more messages;
program instructions to annotate the one or more timestamps with a description of the one or more relevant dialog acts; and program instructions to store the one or more timestamps with the annotations as the one or more timestamps of interest.

17. The computer system of claim 13, wherein the one or more timestamps of interest are timestamps associated with data related to the IT incident classified into each of one or more relevant dialog acts.

* * * * *